(12) United States Patent
Tiainen

(10) Patent No.: US 10,851,844 B2
(45) Date of Patent: Dec. 1, 2020

(54) CLUTCH ASSEMBLY

(71) Applicant: E-AAM DRIVELINE SYSTEMS AB, Trollhättan (SE)

(72) Inventor: Mikael Tiainen, Lindome (SE)

(73) Assignee: e-AAM Driveline Systems AB, Trollhättan (SE)

( * ) Notice: Subject to any disclaimer, the term of this patent is extended or adjusted under 35 U.S.C. 154(b) by 46 days.

(21) Appl. No.: 16/461,022

(22) PCT Filed: Nov. 16, 2017

(86) PCT No.: PCT/IB2017/057180
§ 371 (c)(1),
(2) Date: May 15, 2019

(87) PCT Pub. No.: WO2018/092066
PCT Pub. Date: May 24, 2018

(65) Prior Publication Data
US 2019/0316637 A1 Oct. 17, 2019

Related U.S. Application Data

(60) Provisional application No. 62/422,651, filed on Nov. 16, 2016.

(51) Int. Cl.
*F16D 21/06* (2006.01)
*F16D 13/56* (2006.01)
*F16D 13/68* (2006.01)

(52) U.S. Cl.
CPC ............ *F16D 13/56* (2013.01); *F16D 13/683* (2013.01); *F16D 21/06* (2013.01); *F16D 2021/0692* (2013.01)

(58) Field of Classification Search
CPC ........ F16D 13/56; F16D 13/683; F16D 21/06; F16D 2021/0692; F16D 13/52
See application file for complete search history.

(56) References Cited

U.S. PATENT DOCUMENTS 2,057,559 A * 10/1936 De Backer .............. F16D 21/06
192/48.7
2,213,111 A * 8/1940 Strout ..................... F16D 67/04
192/18 A (Continued)

FOREIGN PATENT DOCUMENTS

EP 0345423 A1 12/1989
GB 2264988 A 9/1993

OTHER PUBLICATIONS

International Search Report and Written Opinion issued in PCT/IB2017/057180, dated Apr. 20, 2018; ISA/EP.

*Primary Examiner* — Mark A Manley
(74) *Attorney, Agent, or Firm* — Burris Law, PLLC

(57) ABSTRACT

A clutch assembly with a clutch input, first and second clutch outputs, a first clutch pack between the clutch input and the first clutch output, and a second clutch pack between the clutch input and the second clutch output. A clutch spring is positioned in the clutch assembly to engage the first clutch pack so that rotary power is normally transmitted from the clutch input, through the first clutch pack to the first clutch output. Disengagement of the first clutch pack occurs automatically when the second clutch pack is engaged to transmit rotary power between the clutch input and the second clutch output.

11 Claims, 5 Drawing Sheets

(56) References Cited

U.S. PATENT DOCUMENTS 3,521,731 A * 7/1970 Labat ..................... F16D 21/06
                                                192/48.91
4,966,270 A    10/1990 Rispeter et al.

* cited by examiner

CLUTCH ASSEMBLY

CROSS-REFERENCE TO RELATED APPLICATIONS

This application is a U.S. National Phase Application under 35 U.S.C. 371 of International Application No. PCT/IB2017/057180, filed Nov. 16, 2017, which claims the benefit of U.S. Provisional Patent Application No. 62/422,651 filed Nov. 16, 2016. The disclosures of the above applications are incorporated by reference as if fully set forth in detail herein.

FIELD

The present disclosure relates to a clutch assembly.

BACKGROUND

This section provides background information related to the present disclosure which is not necessarily prior art.

It is relatively common to have clutch assembly with a "movable element" in a two-speed transmission in which the "movable element" is movable between a first position, which causes the two-speed transmission to operate in a first speed ratio, a second position, which causes the two-speed transmission to operate in a second speed ratio, and an intermediate position between the first and second positions that causes the two-speed transmission to operate in a neutral manner (i.e., a manner that permits independent relative rotation between the input and output of the two-speed transmission). Configuration in this manner permits the position of the "movable element" to be changed while rotary power is being provided to the two-speed transmission. This approach, however, has several drawbacks including the inability of the "movable element" to move to a desired position in certain situations, such as a torque-lock situation that inhibits sliding movement of the "movable element" or a situation in which tooth-on-tooth contact that blocks movement of the "movable element". Accordingly, there is a need in the art for an improved clutch assembly configuration for use with a two-speed transmission.

SUMMARY

This section provides a general summary of the disclosure, and is not a comprehensive disclosure of its full scope or all of its features.

In one form, the present teachings provide a clutch assembly having a first clutch member, a first apply plate, a clutch spring, a second clutch member, a first clutch pack, a first backing plate, a third clutch member, a second clutch pack, a second backing plate and a second apply plate. The first clutch member has a clutch drum and an annular end plate that is coupled to an end of the clutch drum. The clutch drum defines a plurality of teeth and a plurality of valley. The first apply plate is received in the clutch drum and is non-rotatably but axially slidably coupled to the clutch drum. The clutch spring is disposed between the first apply plate and the annular end plate. The clutch spring biases the first apply plate away from the annular end plate. The second clutch member has a first hub. The first clutch pack has first clutch plates, which are non-rotatably but axially slideably coupled to the clutch drum, and second clutch plates that are interleaved with the first clutch plates and non-rotatably but axially slidably coupled to the first hub. The first backing plate is abutted to the first clutch pack on a side opposite the first apply plate. The third clutch member has a second hub. The second clutch pack is received in the clutch drum and has third clutch plates, which are non-rotatably but axially slidably coupled to the clutch drum, and fourth clutch plates that are interleaved with the third clutch plates and non-rotatably but axially slidably coupled to the second hub. The second backing plate is received in the clutch drum and has a plate member and a plurality of fingers. The plate member is abutted to the second clutch pack. The fingers extend from the plate member away from the second clutch pack. Each of the fingers is received in an associated finger slot. Each of the finger slots is bounded on a radially outer side by the clutch drum and each of the finger slots is bounded on a radially inner side by the first clutch plates and the first backing plate. The second apply plate is received in the clutch drum and abuts the second clutch pack on a side opposite the second backing plate. The clutch assembly is operable in a first mode in which the clutch spring biases the first apply plate toward the first backing plate to engage the first and second clutch plates to one another. The clutch assembly is also operable in a second mode in which the second apply plate is translated toward the first apply plate to engage the third and fourth clutch plates to one another and to translate the fingers into engagement with the first apply plate such that the first apply plate is driven away from the first backing plate against the bias of the clutch spring to lessen engagement between the first and second clutch plates.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
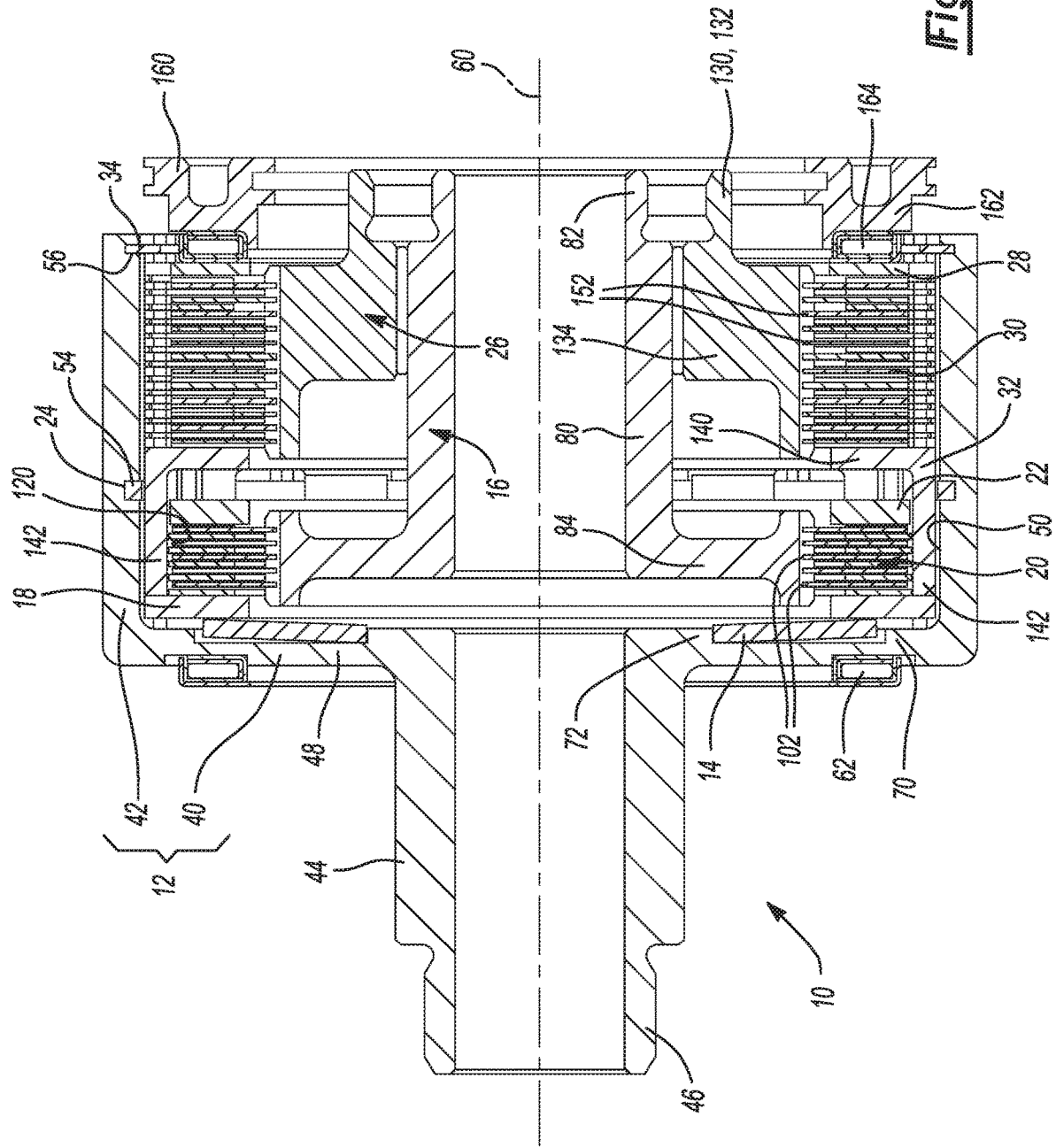
FIG. 1 is a longitudinal cross-sectional view of an exemplary clutch assembly constructed in accordance with the teachings of the present disclosure.
Figure 2:
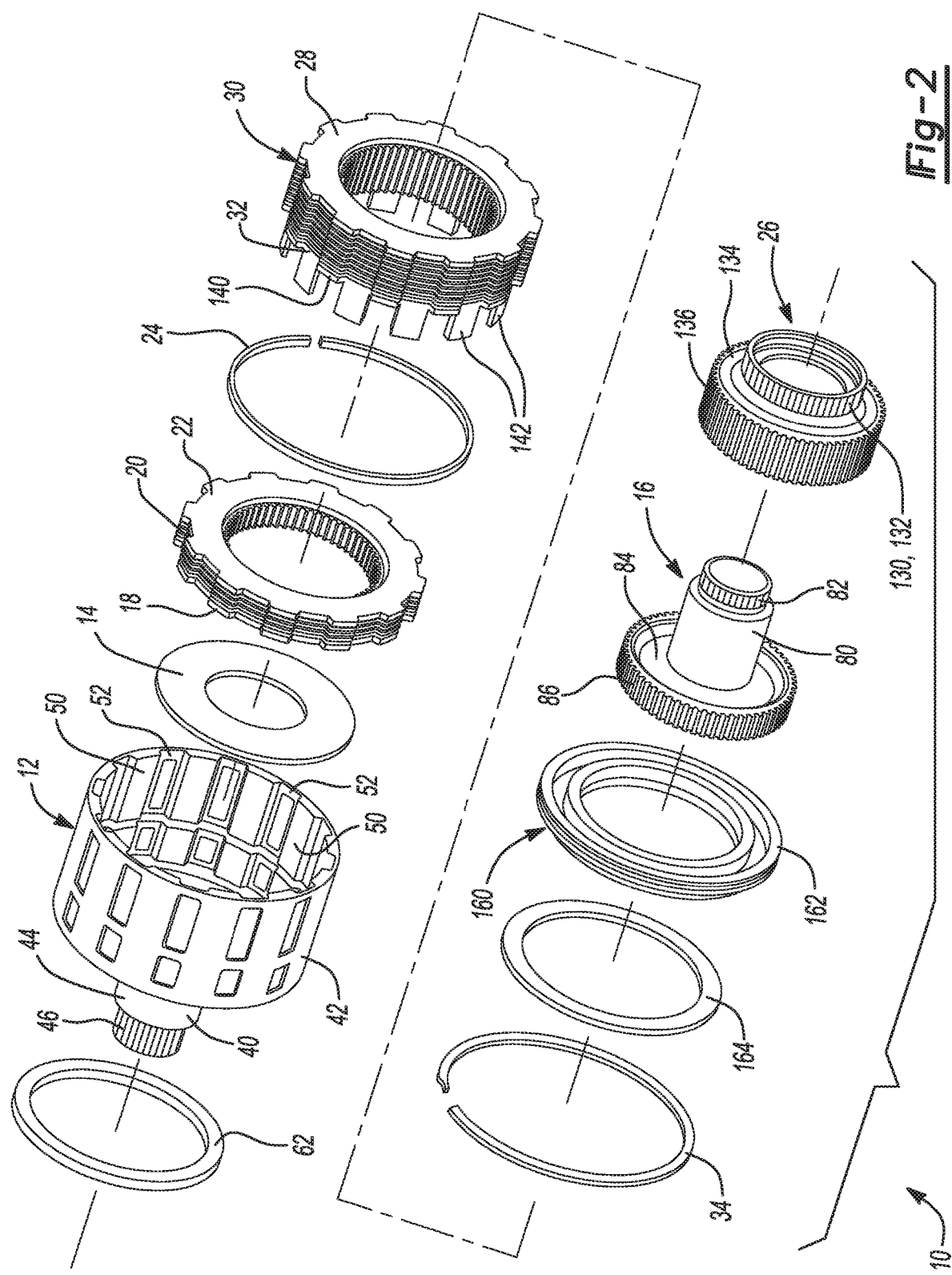
FIG. 2 is an exploded perspective view of the clutch assembly of FIG. 1.

With reference to FIGS. 1 and 2 of the drawings, an exemplary clutch assembly constructed in accordance with the teachings of the present disclosure is generally indicated by reference numeral 10. The clutch assembly 10 can include a first clutch member 12, a clutch spring 14, a second clutch member 16, a first apply plate 18, a first clutch pack 20, a first backing plate 22, a first retaining ring 24, a third clutch member 26, a second apply plate 28, a second clutch pack 30, a second backing plate 32, and a second retaining ring 34. In the particular example provided, the clutch assembly 10 is employed to selectively transmit rotary power to the first or high-range input (not shown) and the second or low-range input (not shown) of an electric drive unit (not shown). The electric drive unit can include a two-speed transmission (not shown), which receives rotary power transmitted through the clutch assembly 10, and a differential assembly (not shown) that receives rotary power from the two-speed transmission. It will be appreciated, however, that the clutch assembly 10 could be used in various other devices, including powertrain and drivetrain devices such as power take-off units, transfer cases and transmissions/gear boxes.

Figure 4:
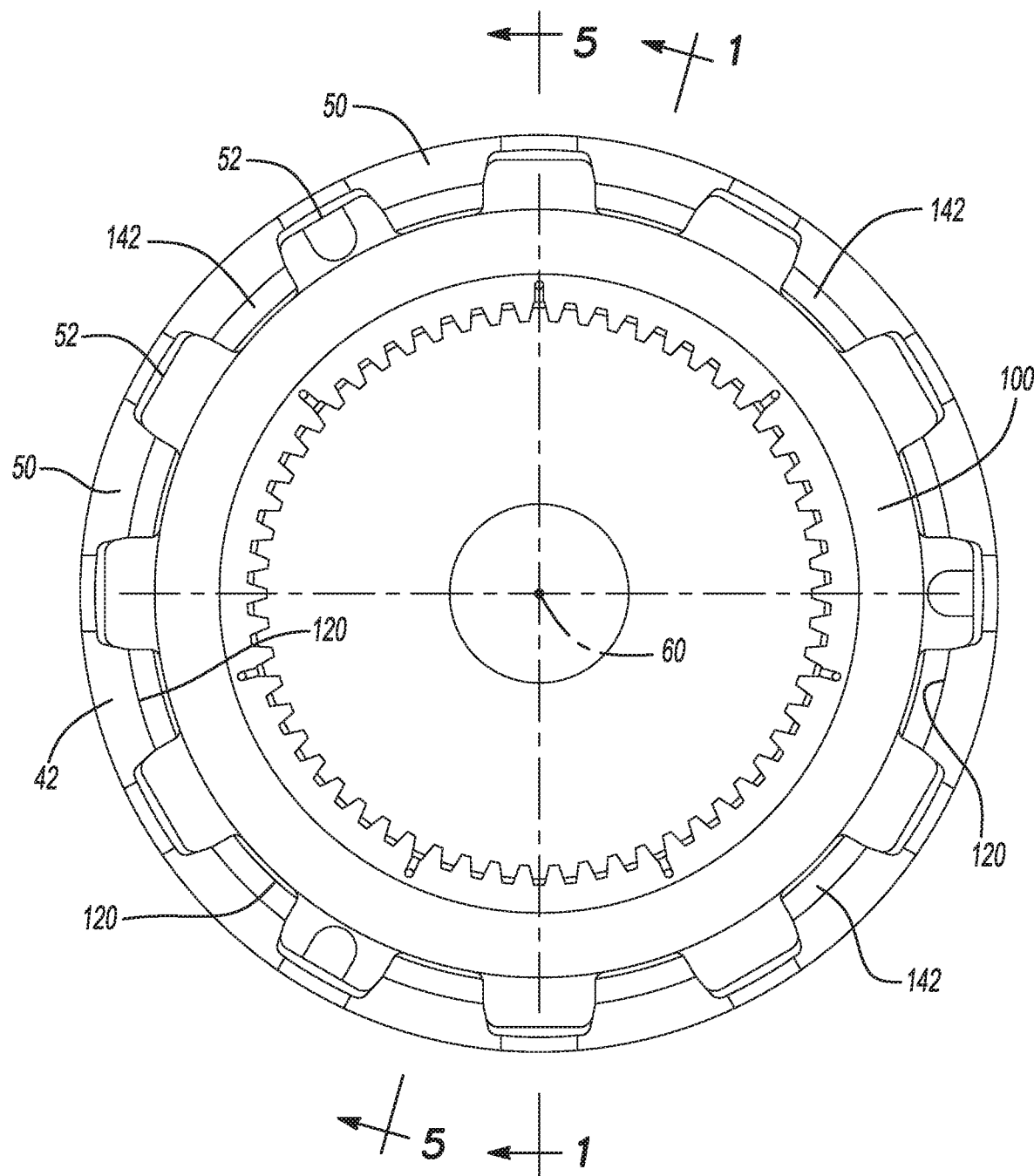
FIG. 4 is a lateral cross-sectional view of the clutch assembly of FIG. 1 taken through a first clutch pack.
Figure 5:
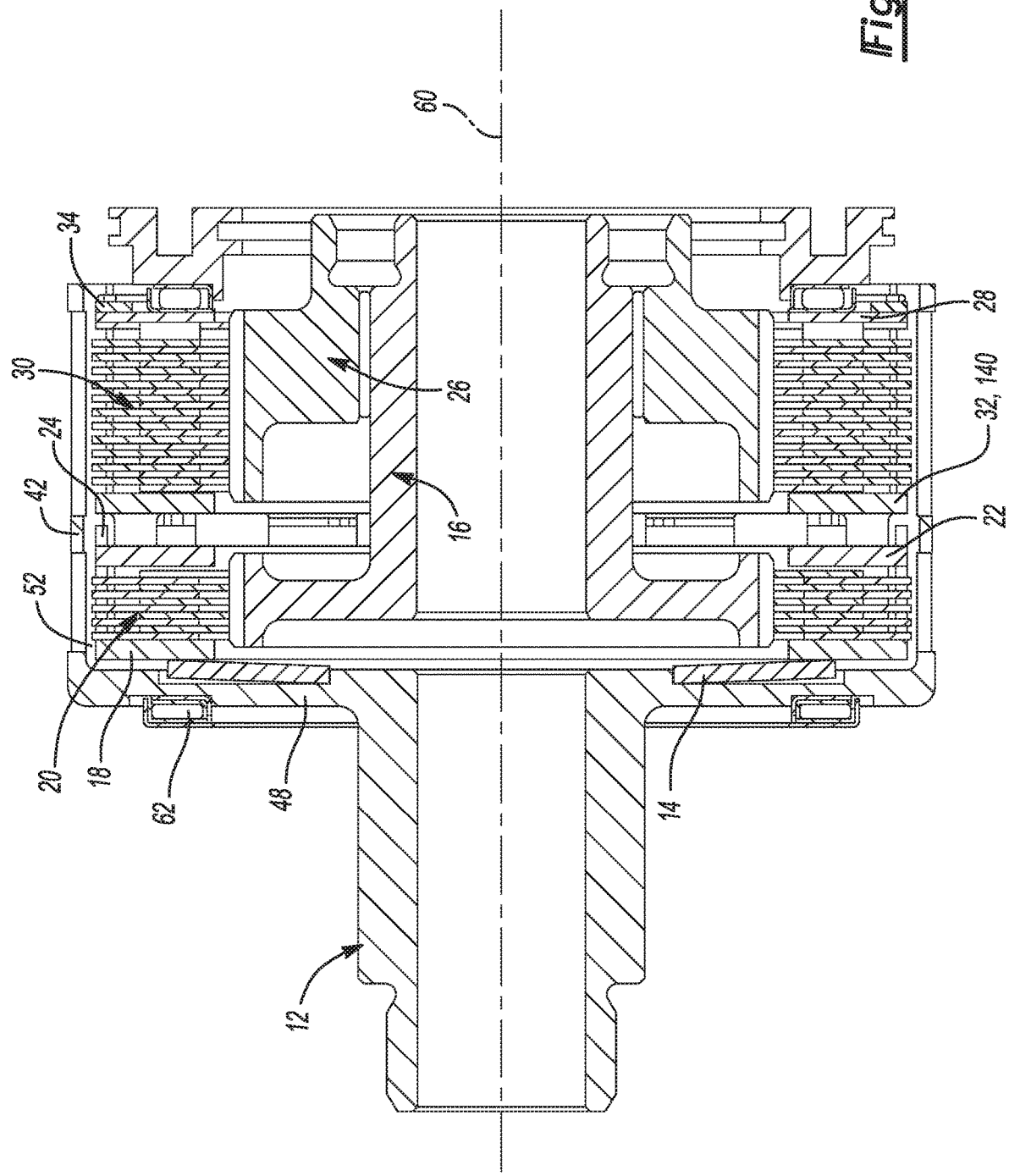
FIG. 5 is a longitudinal cross-sectional view of the clutch assembly of FIG. 1 taken along the line 5-5 of FIG. 4.

In FIGS. 1, 2 and 4, the first clutch member 12 can be configured as the input to the clutch assembly 10 and can define a first hub 40 and a clutch drum 42. In the example provided, the first hub 40 includes a hollow shaft member 44, which has a set of external spline teeth 46 formed thereon, and an annular end plate 48 that is fixedly coupled to an end of the shaft member 44 that is opposite the set of external spline teeth 46. The clutch drum 42 can be a hollow, generally cylindrical structure that can be fixedly coupled to the first hub 40 such that the annular end plate 48 closes an axial end of the clutch drum 42. The clutch drum 42 can define a plurality of alternating teeth 50 and valleys 52, which can be disposed about an interior surface of the clutch drum 42, and first and second retaining ring grooves 54 and 56, respectively, that can be formed on the interior surface of the clutch drum 42 so as to intersect the alternating teeth 50 and valleys 52 in two axially spaced apart locations. The first clutch member 12 can be rotatable about a rotational axis 60. A first thrust bearing 62 can be disposed on a side of the annular end plate 48 that is opposite the clutch drum 42 and can be configured to transmit axial loads between the first clutch member 12 and another structure (not shown).

In FIGS. 1 and 2, the clutch spring 14 can comprise one or more spring members that can be received in the clutch drum 42 and abutted against the annular end plate 48. In the example provided, the clutch spring 14 comprises a single Belleville spring washer that is received in an annular pocket 70 formed into the annular end plate 48; the annular pocket 70 defines a spring shoulder 72 onto which the single Belleville spring washer is mounted. It will be appreciated, however, that any number of Belleville spring washers could be employed and that in the alternative, one or more other types of springs, such as coil compression springs, could be employed in the alternative.

The second clutch member 16 can be configured as a first output of the clutch assembly 10 and is rotatable about the rotational axis 60. The second clutch member 16 can comprise a shaft member 80, which can have a set of spline teeth 82, and an annular hub member 84 that is fixed to an end of the shaft member 80 opposite the set of spline teeth 82. The set of spline teeth 82 can be employed for example to non-rotatably couple the second clutch member 16 to the first or high-range input of the two-speed transmission of the electric drive unit. The annular hub member 84 can define a plurality of external spline teeth 86 about its outer peripheral surface.

Figure 3:
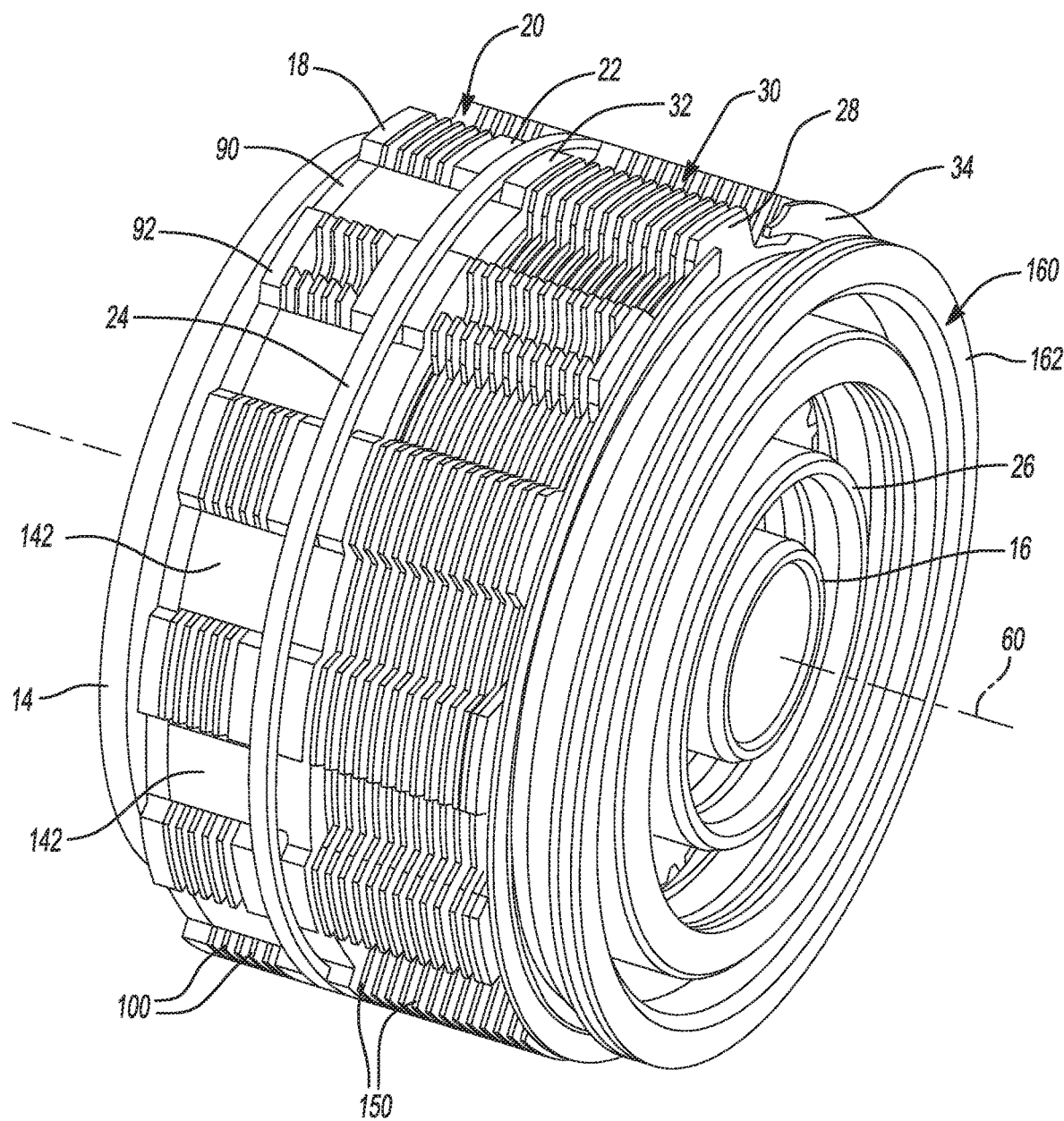
FIG. 3 is a perspective view of a portion of the clutch assembly of FIG. 1.

In FIGS. 1 through 3, the first apply plate 18 can be an annular structure that can be received in the clutch drum 42 and abutted against the clutch spring 14. The first apply plate 18 can have a plurality of valleys 90 and teeth 92 that are configured to matingly engage the teeth 50 and valleys 52 of the clutch drum 42. The first apply plate 18 is sized such that it is received over (and does not engage) the annular hub member 84.

With reference to FIGS. 1, 2 and 4, the first clutch pack 20 include a plurality of first clutch plates 100 and a plurality of second clutch plates 102 that can be interleaved with the first clutch plates 100. The first clutch plates 100 can be annular structures that can have a plurality of valleys (not specifically identified) and teeth (not specifically identified) that are configured to matingly engage the teeth 50 and valleys 52 of the clutch drum 42. Each of the first clutch plates 100 is sized such that it is received over (and does not engage) the annular hub member 84. The second clutch plates 102 can be annular structures that can have a plurality of internal spline teeth (not specifically identified) that can be matiningly engaged with the external spline teeth 86 formed on the annular hub member 84 of the second clutch member 16. Each of the second clutch plates 102 is sized such that it does not engage the clutch drum 42. The first clutch pack 20 can be received in the clutch drum 42 and abutted against the first apply plate 18.

With reference to FIGS. 1 through 3, the first backing plate 22 can be an annular structure that can be received in the clutch drum 42 and abutted against the first clutch pack 20 on an end opposite the first apply plate 18. The first backing plate 22 can have a plurality of valleys (not specifically identified) and teeth (not specifically identified) that are configured to matingly engage the teeth 50 and valleys 52 of the clutch drum 42. The first backing plate 22 is sized such that it is received over (and does not engage) the annular hub member 84.

With reference to FIGS. 1 and 4, the valleys in the first clutch plates 100 and the first backing plate 22 are spaced radially inwardly from the interior surface of the clutch drum 42 to define a plurality of finger slots 120 that are circumferentially spaced about the clutch drum 42 and extend parallel to the rotational axis 60. Optionally, the second clutch plates 102 could be formed with outer peripheral surfaces having a plurality of circumferentially spaced apart valleys (not specifically shown) that are aligned to the valleys in the first clutch plates 100 and the first backing plate 22. Configuration in this manner permits the second clutch plates 102 to be relatively large in diameter while not blocking the finger slots 120.

With reference to FIGS. 1 through 3, the first retaining ring 24 can be an internal retaining ring that can be received into the first retaining ring groove 54 formed in the clutch drum 42. The first retaining ring 24 is configured to contact the teeth on the first backing plate 22 to limit movement of the first backing plate 22 in a direction along the rotational axis 60 away from the first apply plate 18.

The third clutch member 26 can be configured as a second output of the clutch assembly 10 and can be disposed concentrically about the shaft member 80 of the second clutch member 16 for rotation about the rotational axis 60. The third clutch member 26 can comprise a shaft member 130, which can have a set of spline teeth 132, and an annular hub member 134 that is fixed to an end of the shaft member 130 opposite the set of spline teeth 132. The set of spline teeth 132 can be employed for example to non-rotatably couple the third clutch member 26 to the second or low-range input of the two-speed transmission of the electric drive unit. The annular hub member 134 can define a plurality of external spline teeth 136 about its outer peripheral surface.

With reference to FIGS. 1 through 4, the second backing plate 32 can include an annular plate member 140 and a plurality of fingers 142. The annular plate member 140 can be received in the clutch drum 42 and can have a plurality of valleys (not specifically identified) and teeth (not specifically identified) that are configured to matingly engage the teeth 50 and valleys 52 of the clutch drum 42. The second backing plate 32 is sized such that it is received over (and does not engage) the annular hub member 134. The fingers 142 can be coupled to and spaced circumferentially about the annular plate member 140. Each of the fingers 142 can be received in a corresponding one of the finger slots 120 and can be abutted against the first apply plate 18.

In FIGS. 1 through 3, the second clutch pack 30 can include a plurality of third clutch plates 150 and a plurality of fourth clutch plates 152 that can be interleaved with the third clutch plates 150. The third clutch plates 150 can be annular structures that can have a plurality of valleys (not specifically identified) and teeth (not specifically identified) that are configured to matingly engage the teeth 50 and valleys 52 of the clutch drum 42. Each of the third clutch plates 150 is sized such that it is received over (and does not engage) the annular hub member 134. The fourth clutch plates 152 can be annular structures that can have a plurality of internal spline teeth (not specifically identified) that can be matingly engaged with the external spline teeth 46 formed on the annular hub member 134 of the third clutch member 26. Each of the fourth clutch plates 152 is sized such that it does not engage the clutch drum 42. The first clutch pack 20 can be received in the clutch drum 42 and abutted against the annular plate member 140 of the second backing plate 32.

The second apply plate 28 can be an annular structure that can be received in the clutch drum 42 and abutted against the second clutch pack 30. The second apply plate 28 can have a plurality of valleys (not specifically identified) and teeth (not specifically identified) that are configured to matingly engage the teeth 50 and valleys 52 of the clutch drum 42. The first apply plate 18 is sized such that it is received over (and does not engage) the annular hub member 134.

The second retaining ring 34 can be received in the second retaining ring groove 56 in the clutch drum 42 and can limit movement of the second apply plate 28 and the second clutch pack 30 along the rotational axis 60 away from the annular end plate 48 of the first clutch member 12.

The clutch spring 14 is configured to bias the first apply plate 18 toward the first backing plate 22; since the first retaining ring 24 limits movement of the first backing plate 22 relative to the clutch drum 42 along the rotational axis 60 in a direction away from the first apply plate 18, movement of the first apply plate 18 toward the first backing plate 22 (caused by the clutch spring 14) results in the compression of the first clutch pack 20 to thereby engage the first and second clutch plates 100 and 102 to one another. This permits rotary power to be transmitted from the first clutch member 12 through the first clutch pack 20 to the second clutch member 16.

A clutch actuator 160 can be provided to cause disengagement of the first clutch pack 20 and engagement of the second clutch pack 30. The clutch actuator 160 can be any kind of actuator that can be configured to apply an axially directed force to the second apply plate 28 to cause engagement of the second clutch pack 30 and may be operated via a mechanical, pneumatic, hydraulic or electric input. For example, the clutch actuator 160 could be a type of ball-ramp actuator (not shown) that can be operated electro-mechanically (e.g., having an electro-magnetically operated friction clutch to selectively provide rotational resistance that causes the ball ramps to rotate relative to one another). Such mechanisms are well known in the art and need not be disclosed in detail herein. In the example provided, the clutch actuator 160 comprises a piston 162 that is part of a hydraulic cylinder (not shown). An optional thrust bearing 164 is disposed between the piston 162 and the second apply plate 28. The piston 162 can be advanced along the rotational axis 60 in a direction toward the annular end plate 48 to move the second apply plate 28 in the direction toward the annular end plate 48 and cause the third and fourth clutch plates 150 and 152 to engage one another. An axially-directed reaction force applied to the second backing plate 32 by the second clutch pack 30 is transmitted via the fingers 142 to the first apply plate 18. When the reaction force on the first apply plate 18 is of a magnitude that is greater than a magnitude of the force that is exerted on the first apply plate 18 by the clutch spring 14, the first apply plate 18 can be positioned so that a) the clutch spring 14 is be compressed so that the force that is transmitted to the first clutch pack 20 is insufficient to prevent rotational slippage between the first and second clutch members 12 and 16, and b) the second backing plate 32 does not move further toward the annular end plate 48 so that the second clutch pack 30 can be fully engaged to thereby drivingly couple the third clutch member 26 to the first clutch member 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A clutch assembly comprising:
a first clutch member with a clutch drum and an annular end plate that is coupled to an end of the clutch drum, the clutch drum defining a plurality of teeth and a plurality of valleys;
a first apply plate received in the clutch drum, the first apply plate being non-rotatably but axially slidably coupled to the clutch drum;
a clutch spring disposed between the first apply plate and the annular end plate, the clutch spring biasing the first apply plate away from the annular end plate;
a second clutch member with a first hub;
a first clutch pack having first and second clutch plates, the first clutch plates being non-rotatably but axially slideably coupled to the clutch drum, the second clutch plates being interleaved with the first clutch plates and being non-rotatably but axially slidably coupled to the first hub;
a first backing plate abutted to the first clutch pack on a side opposite the first apply plate;
a third clutch member with a second hub;
a second clutch pack received in the clutch drum and having third and fourth clutch plates, the third clutch plates being non-rotatably but axially slidably coupled to the clutch drum, the fourth clutch plates being interleaved with the third clutch plates and being non-rotatably but axially slidably coupled to the second hub;
a second backing plate received in the clutch drum and having a plate member and a plurality of fingers, the plate member being abutted to the second clutch pack, the fingers extending from the plate member away from the second clutch pack, each of the fingers being received in an associated finger slot, each of the finger slots being bounded on a radially outer side by the clutch drum, each of the finger slots being bounded on a radially inner side by the first clutch plates and the first backing plate; and a second apply plate received in the clutch drum, the second apply plate abutting the second clutch pack on a side opposite the second backing plate;

wherein the clutch assembly is operable in a first mode in which the clutch spring biases the first apply plate toward the first backing plate to engage the first and second clutch plates to one another, and wherein the clutch assembly is operable in a second mode in which the second apply plate is translated toward the first apply plate to engage the third and fourth clutch plates to one another and to translate the fingers into engagement with the first apply plate such that the first apply plate is driven away from the first backing plate against the bias of the clutch spring to lessen engagement between the first and second clutch plates.

2. The clutch assembly of claim 1, wherein the clutch spring comprises a Belleville spring washer.

3. The clutch assembly of claim 1, further comprising a thrust washer mounted on the first clutch member and abutting the annular end plate.

4. The clutch assembly of claim 1, wherein the second clutch member has a first set of output spline teeth and the third clutch member has a second set of output spline teeth that are disposed concentrically with the first set of output spline teeth.

5. The clutch assembly of claim 4, wherein the second set of output spline teeth are disposed radially outwardly of the first set of output spline teeth.

6. The clutch assembly of claim 4, wherein at least a portion of the teeth of the first set of output spline teeth overlap the teeth of the second set of output spline teeth along a rotational axis of the first clutch member.

7. The clutch assembly of claim 4, wherein one of the first and second sets of output spline teeth consist of external spline teeth, and wherein the other one of the first and second sets of output spline teeth consist of internal spline teeth.

8. The clutch assembly of claim 1, further comprising a clutch actuator that is configured to selectively move the second apply plate toward the second clutch pack.

9. The clutch assembly of claim 8, wherein the actuator comprises a piston.

10. The clutch assembly of claim 8, further comprising a thrust bearing disposed between the actuator and the second apply plate.

11. The clutch assembly of claim 1, further comprising a two-speed transmission having a low-speed input, which is coupled to one of the second and third clutch members for rotation therewith, and a high-speed input that is coupled to the other one of the second and third clutch members for rotation therewith.

* * * * *